United States Patent
Johnson et al.

[11] Patent Number: 6,056,269
[45] Date of Patent: May 2, 2000

[54] MICROMINIATURE VALVE HAVING SILICON DIAPHRAGM

[75] Inventors: Paul H. Johnson, Media, Pa.; Timothy Slater, San Francisco, Calif.

[73] Assignee: Hewlett-Packard Company, Palo Alto, Calif.

[21] Appl. No.: 09/231,248

[22] Filed: Jan. 15, 1999

[51] Int. Cl.$^7$ .................................................. F16K 31/126
[52] U.S. Cl. ........................................... 251/331; 251/368
[58] Field of Search ............................ 251/331, 11, 268

[56] References Cited

U.S. PATENT DOCUMENTS

| | | |
|---|---|---|
| 4,471,647 | 9/1984 | Jerman et al. . |
| 4,474,889 | 10/1984 | Terry et al. . |
| 4,756,508 | 7/1988 | Giachino et al. ........................ 251/331 |
| 4,935,040 | 6/1990 | Goedert . |
| 4,977,776 | 12/1990 | Shindo et al. . |
| 5,058,856 | 10/1991 | Gordon et al. . |
| 5,069,419 | 12/1991 | Jerman ..................................... 251/11 |
| 5,333,831 | 8/1994 | Barth et al. . |
| 5,652,398 | 7/1997 | Johnson . |
| 5,922,591 | 7/1999 | Anderson et al. .................... 435/287.2 |

OTHER PUBLICATIONS

Dissertation by Stephen Clark Terry, Stanford University, Ph.D, E.E., May, 1975; "A Gas Chromatography System Fabricated On A Silicon Wafer Using Integrated Circuit Technology"; pp. 41–128. UMI Dissertation Services, Ann Arbor, MI.

James B. Angell, Stephen C. Terry and Phillip W. Barth, "Silicon Micromechanical Devices" Scientific American, Mar., 1983, pp. 44–55.

Stephen C. Terry, John H. Herman and James B. Angell, A Gas Chromatographic Air Analyzer Fabricated on a Silicon Wafer, IEEE Transactions on Electron Devices, vol. ED–26, No. 12, Dec., 1979, pp. 1880–1886.

*Primary Examiner*—Kevin Lee

[57] ABSTRACT

Microminiature valve includes a valve seat substrate having opposed upper and lower major surfaces, a flow channel extending from said lower major surface to a port on an exterior surface of the microminiature valve, an integral valve seat structure extending from the upper major surface, the valve seat structure surrounding the flow channel and including a valve seat, and a recess located in a surround in the upper major surface, wherein the recess surrounds the valve seat structure. A diaphragm preferably formed of silicon is positionable by deflection against the valve seat substrate and includes an lower surface functional as a valve face and positionable in a closed position with respect to the valve seat to obstruct fluid flow through said flow channel, and in an open position with respect to the valve seat to permit fluid flow through said flow channel.

5 Claims, 2 Drawing Sheets

_6,056,269_

MICROMINIATURE VALVE HAVING SILICON DIAPHRAGM

FIELD OF THE INVENTION

The present invention relates generally to microminiature devices and more particularly to microfluidic valve devices.

BACKGROUND OF THE INVENTION

The development of microminiature mechanical devices has advanced generally by use of a technique known as micromachining or microfabrication. See for instance, the discussion of microfabrication of mechanical devices by Angell et al. in "Silicon Micromechanical Devices," _Scientific American_, (April 1983), pp. 44–55. For example, a microactuator may comprise part of a microminiature valve used to control the flow of a carrier gas through a capillary column in a gas chromatograph. The microactuator may be required to open or close a fluid passage by displacing a moveable member (typically a moveable membrane, diaphragm, or boss) against a pressure of 200 pounds per square inch (1375 kilopascals), through a distance of as much as 100 micrometers.

Typically, applied power from an external source is provided to the microactuator, which employs one of various techniques to convert the applied power to an actuating force. Such microactuators can be considered as being actively-driven. Often the applied power is driven by a solenoid or gas pressure, or an electrical transducer that converts applied electrical power to thermal power. For example, an array of micromachined bi-metallic legs has been employed to provide a thermally-driven actuating force in a microminiature valve. As the bimetallic legs are heated, stresses are generated in the structure to deflect a protruding boss adjacent to an orifice, increasing or decreasing the flow of fluid to an attached fluid-bearing system.

The performance of the microminiature valve is determined in large part by its ability to operate in high temperature environment. If the thermal environment for the microminiature valve due to its surroundings is high, the microminiature valve will require a compliant diaphragm that effects suitable valve operation yet withstands the high temperature environment. Prior art approaches have employed a valve having a diaphragm that includes a valve seat etched in a silicon wafer and a flexible polymer valve diaphragm. The polymer diaphragm microminiature valve operating temperature limit is about 110° C. A higher operating temperature limit is desired.

Hence, prior art approaches have not sufficiently attended to the degradation of the typical microminiature valve during exposure to high temperatures. A microminiature valve capable of operating in a high-temperature environment is accordingly desirable for use in for use in, for example, analytical instrumentation such as gas chromatographic instruments. In particular, an instrument with an injector that incorporates the high temperature microminiature valve can analyze samples containing higher-boiling sample components than an instrument with an injector that incorporates a valve of conventional design.

SUMMARY OF THE INVENTION

A device for controlling the flow of a fluid may be constructed according to the present invention, wherein the device includes a valve seat substrate having opposed upper and lower major surfaces and a flow channel extending from said upper major surface to a port in an exterior surface, an integral valve seat structure extending from the upper major surface, the valve seat structure surrounding the flow channel; and including a valve seat, and a recess located in a surround in the upper major surface, wherein the recess surrounds the valve seat structure. A diaphragm is attached to the upper major surface of the valve seat substrate and includes a lower surface operable as a valve face that is positionable by deflection of a central portion of the diaphragm at a closed position with respect to the valve seat to obstruct fluid flow through the flow channel and in an open position with respect to the valve seat to permit fluid flow through the flow channel. Alternative embodiments may include a recess in the diaphragm such that the recessed portion of the diaphragm offers a degree of compliance that differs from that of the remainder of the diaphragm.

In the preferred embodiment of the invention, the valve seat substrate and the diaphragm in the microminiature valve are formed of a single micromachinable material such as silicon. In the preferred embodiment of the invention, the valve seat substrate and the diaphragm in the microminiature valve may be formed of differing micromachinable materials having substantially similar thermal coefficients, each of which is amenable to micromachining yet is functional in a high temperature environment. Preferably, the valve seat substrate and the diaphragm are respective first and second simple planar layers of silicon that are each easily fabricated using well-know techniques.

In a particularly preferred embodiment, the diaphragm is provided in the form of a planar silicon layer having a substantially uniform thickness in the range of about 20–80 micrometers. The resulting silicon diaphragm microminiature valve is then amenable to repeated deflection yet is capable of operating at temperatures exceeding 250° C. In an alternative embodiment, the diaphragm is provided in the form of a silicon layer of greater thickness than previously described but includes a central portion that is etched or otherwise reduced in thickness so as to include a compliant region of reduced thickness in which the valve face is located.

Because the valve seat substrate and the diaphragm in the microminiature valve are formed of one or more micromachinable materials having identical, or at least substantially similar thermal coefficients, the interface of the diaphragm and the valve seat substrate is quite amenable to bonding so as to form a robust and reliable peripheral seal about the valve well. The interface is therefore much less susceptible to the undesirable effects of dissimilar coefficients of expansion, such as failure of the bond at the interface, and the subsequent leakage of the fluid to be controlled by the microminiature valve. Preferred methods to bond the silicon diaphragm wafer to the valve seat substrate include wafer-wafer fusion bonding, and the use of a spin-on-glass (sodium silicate solution) as an adhesive.

In the open position, the distance between the valve seat and the valve diaphragm is sufficient to allow fluid flow through the seat orifice to a well orifice in the valve well located inside the valve seat ring, and then through a passage under the valve well to an exterior port located outside the valve seat ring. The valve may be closed when the silicon diaphragm is actuated to press against the valve seat. The actuating force is preferably applied to the upper exterior surface of the diaphragm by conventional means such as a pressurized fluid, a solenoid mechanism, or other actuating means operable to deflect the silicon diaphragm.

In one feature of the invention, the pressure-tight seal of the silicon diaphragm on the valve seat has been observed to become more effective as the temperature of the device increases from room temperature to approximately 250 degrees C.

In another feature of the invention, as the diaphragm is gradually deflected toward the valve seat by an actuation force, the flow of fluid through the valve is respectively restricted; therefore, intermediate flow control is also achievable by applying an amount of actuation force that is less than that required for full closure of the microminiature valve.

BEST MODE OF CARRYING OUT THE INVENTION

Whereas the following description is directed to a microactuator in the form of a microminiature valve, it is contemplated that the teachings of the present invention may find application in other types of micro-devices that operate by use of a compliant diaphragm required to operate at an elevated temperature. Examples are a microactuator having a diaphragm that is driven by forces developed in a process of gas or liquid expansion/contraction, gas or liquid phase change, or according to changes in bimetallic or shape-memory materials. Accordingly, the present invention will find use in a variety of microactuators that may be employed to operate upon a mechanical device or system, or upon a physical phenomena, such as the flow of fluids (including gases and liquids), electrical and electronic parameters (such as capacitance, current flow, and voltage potential), acoustical and optical parameters (such as reflection, absorption, or diffraction) and simple dimensional parameters (such as acceleration, pressure, length, depth, and so on).

Figure 1:
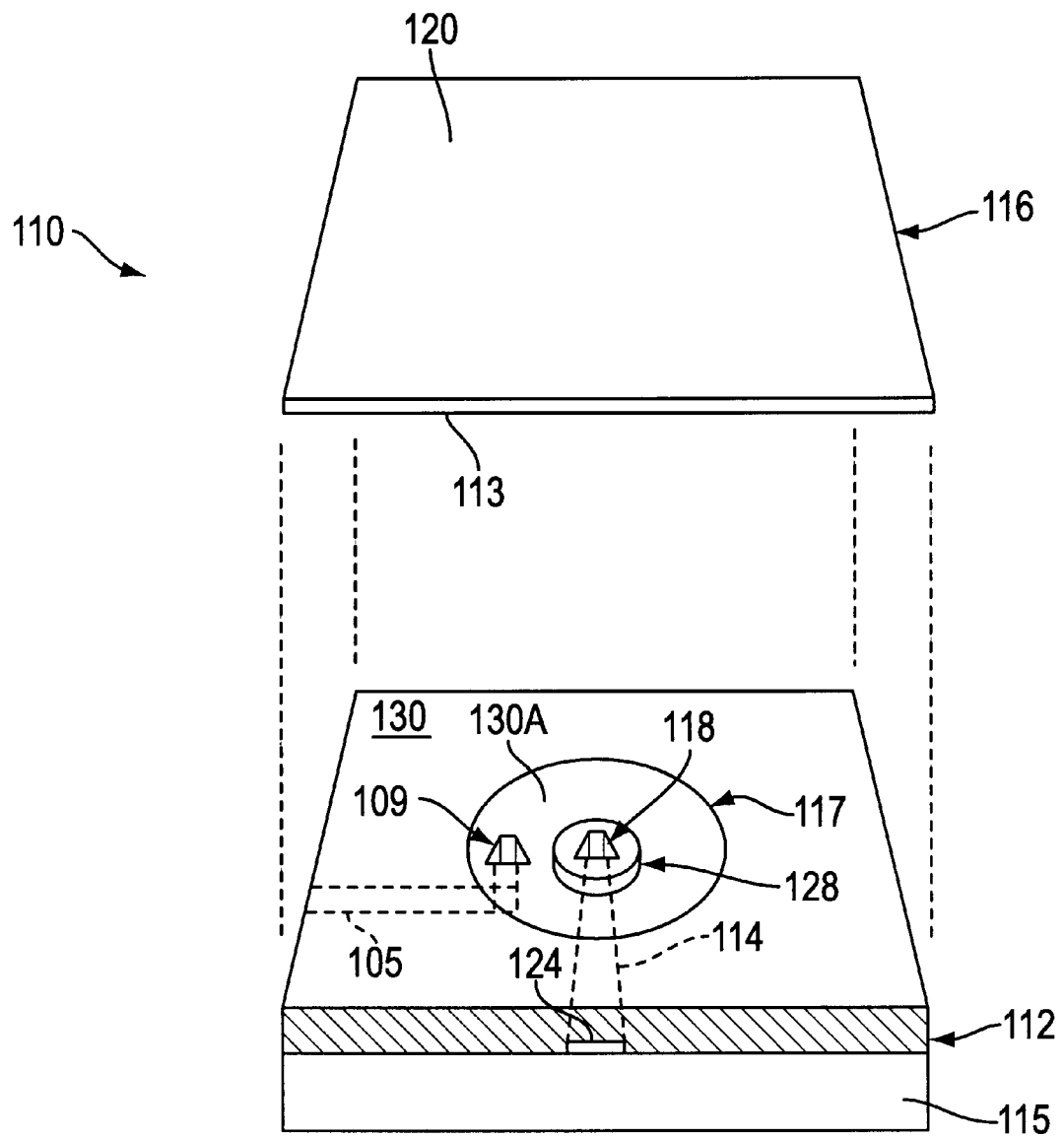
FIG. 1 is a side sectional view of a first preferred embodiment of microminiature valve having a diaphragm, flow orifice, and a valve seat constructed in accordance with the present invention.
Figure 2:
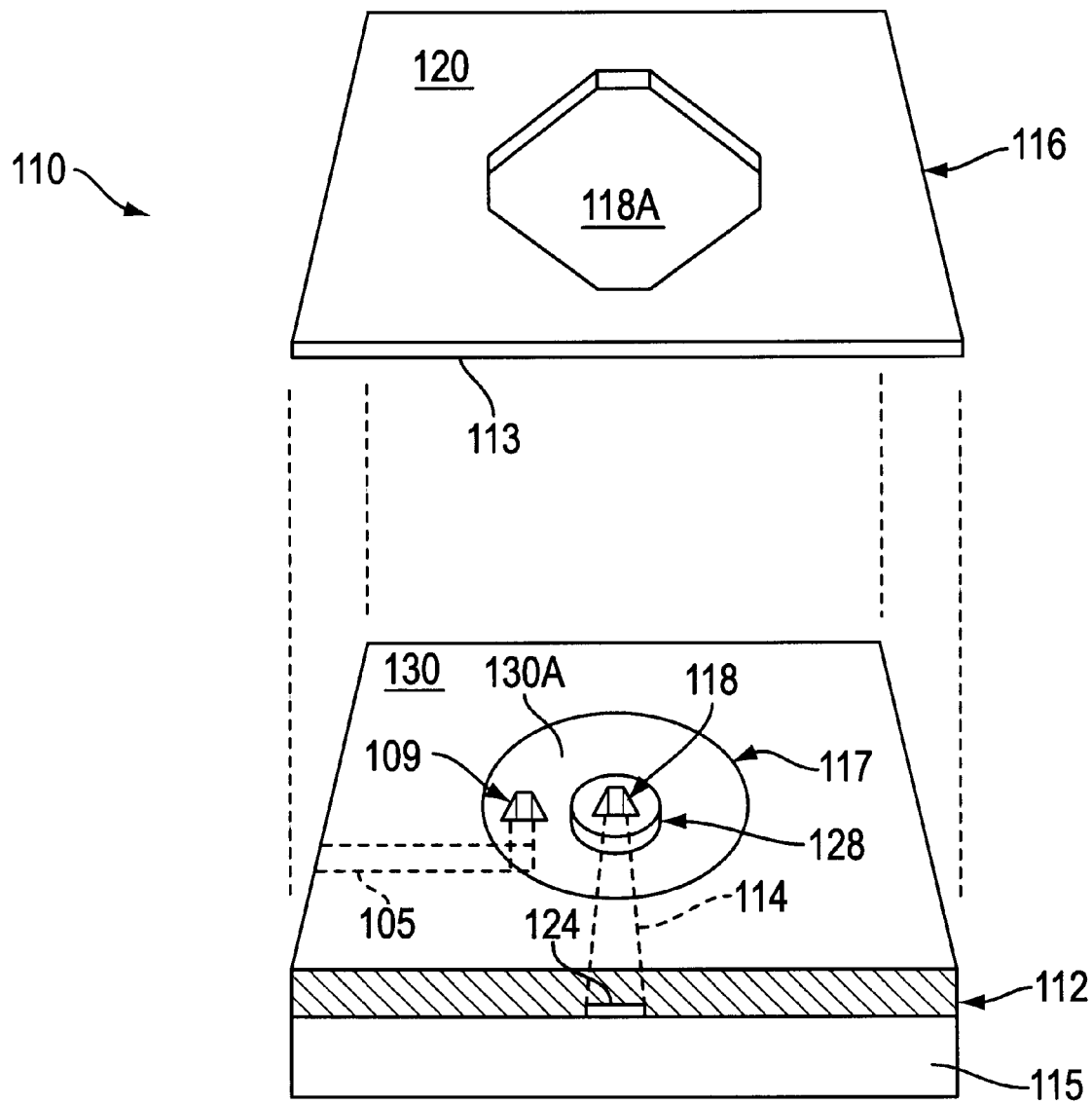
FIG. 2 is a side sectional view of second preferred embodiment of the microminiature valve of FIG. 1, showing a central portion of the upper surface of the diaphragm, wherein the central portion exhibits a reduction in the thickness of the diaphragm.

With reference to FIGS. 1 and 2, respective first and second preferred embodiments of a novel microactuator in the form of a microminiature valve 110 includes a valve seat substrate 112 which may be bonded or otherwise attached to a base 115. The valve seat substrate 112 is preferably a silicon orifice chip which has been fabricated from a wafer using batch processing steps as known in the art. A central flow channel reaches an orifice 118 formed through the seat substrate 112. Supported atop the seat substrate 112 is a diaphragm 116 also preferably formed from silicon that includes upper and lower major surfaces 113, 120. The upper major surface 120 can accommodate an actuating force from an actuator member (not shown) in the form of a pressurized fluid system or solenoid boss, or a thermally-driven actuator such as an array of bi-metallic elements. Modes of thermally-driven actuation are disclosed in commonly-assigned U.S. Pat. No. 5,058,856 to Gordon et al. and commonly-assigned U.S. Pat. 5,333,831 to Barth et al., the disclosures of which are incorporated herein by reference.

The valve seat substrate 112 includes a valve well 117 having the orifice 118 centrally located therein such that the orifice 118 is circumscribed by a valve seat 128. The valve seat 128 is formed atop a raised portion of the valve well 117 that defines a recess 130A formed in an upper major surface 130 of the seat substrate 112. The orifice 118, valve seat 128, and recess 130A are preferably formed by etching of the valve seat substrate 112. The width of the valve seat 128 may be varied, but is chosen to be sufficiently great that the valve seat is not susceptible to fracturing upon repeated contact between the valve seat 128 and the diaphragm 116. Preferably, the length and the width of the diaphragm 116 roughly match the respective dimensions of the valve seat substrate 112 for ease in manufacturing and assembly, although other configurations are contemplated. When the diaphragm 116 is spaced apart from the valve seat substrate 112, the flow channel 114 provides fluid communication between the orifice 118, channels 105, 114, and ports 109, 124. Channel 105 and port 124 may be arranged for fluid communication with one or more ancillary apparatus (not shown) to or from which flow is to be regulated by the microminiature valve 110. The diaphragm 116 is designed to be actuatable such that the diaphragm 116 is seated against the valve seat 128 when the diaphragm 116 is in the closed position, and unseated (i.e., proximate to, but not in contact with) with respect to the valve seat 128 when in the open position. Accordingly, preferred embodiments of the microminiature valve 110 include a diaphragm 116 having thermal and mechanical characteristics so as to be susceptible to repeatedly actuation between the open and closed positions with respect to the valve seat 128.

A prototype embodiment of a microminiature valve as illustrated in FIG. 2 was constructed to include a silicon diaphragm 116 in the form of a silicon wafer of approximately 300 um thick that was etched to about 45 micrometers to form the etched portion 118A. The prototype microminiature valve included: a valve seat substrate 112 having a valve well 117 of about 2000 micrometers in diameter; a valve seat 128 of about 400 um in diameter and rising about 30 micrometers above the upper surface of the recess 130A in the valve well 117, wherein the valve seat 128 included an upper surface width of 40 micrometers; and, when in the open position, exhibited a gap between the upper surface of the valve seat 128 and the most proximate portion of the lower surface 113 of the diaphragm 116 of approximately 9 micrometers. The prototype was tested to full functional operation at 250° C. and was observed to effect a successful fluid seal with an actuation force from a fluid reservoir of 95 PSI applied to the etched portion 118A of the upper surface 120.

Modifications in the structure of the disclosed embodiments may be effected by use of differing patterns in the etch-resistant coatings. In addition, alternative coatings, such as silicon dioxide, are contemplated as being deposited or grown on the surface of the completed structure. Methods to bond diaphragm 116 formed of a silicon wafer to a valve seat substrate 112 include wafer-wafer fusion bonding, and the use of a spin-on-glass (sodium silicate solution) as an adhesive. Further fabrication details are disclosed in U.S. Pat. No. 5,652,398, entitled "Fixed-Volume Injector With Backflush Capability".

Furthermore, while the disclosed embodiments of the present invention have been described as being fabricated using one or more silicon substrates, similar materials having the above-described, thermal and mechanical characteristics, such as other semiconductor or crystalline substrates, may also be used. The base 115 described herein may also be fabricated according to one or more of the following alternatives: borosilicate glass may be fabricated using ultrasonic machining; photosensitive glass may be formed by lithography; a ceramic material may be ultrasonically machined or may be cast and fired; a machinable ceramic may be formed by conventional machining.

What is claimed is:

1. A microminiature device for controlling the flow of a fluid comprising:

a substrate made of silicon having an external surface and a valve seat, such external surface having a circular recess encompassing the valve seat, the substrate having a flow channel therein for carrying fluid opening onto the valve seat; and a diaphragm made of silicon with a major surface thereof secured the external surface of the substrate, the opposing major surface of the diaphragm facing away from the substrate having a noncircular recess therein providing a noncircular reduced thinness portion of the diaphragm, the major surface of the diaphragm at of the noncircular reduced thinness portion being planar and covering the circular recess, the major surface acting as valve face for the valve seat in a closed position to stop the flow of fluid in the flow channel and in an open position to allow flow of fluid in the flow channel.

2. The microminiature device of claim 1 wherein the noncircular recess is an octagon.

3. The microminiature device of claim 2 wherein the major surface of the diaphragm is secured to the external surface of the substrate by a sodium silicate adhesive.

4. The microminiature device of claim 1 wherein the major surface of the diaphragm is secured to the external surface of the substrate by fusion bonding.

5. A microminiature device for controlling the flow of a fluid comprising:

a substrate made of semiconductor material having an external surface and a valve seat, such external surface having a circular recess encompassing the valve seat, the substrate having a flow channel therein for carrying fluid opening onto the valve seat; and a diaphragm made of semiconductor material with a major surface thereof secured to the external surface of the substrate, the opposing major surface of the diaphragm facing away from the substrate having a octagon recess therein providing a octagon reduced thinness portion of the diaphragm, the major surface of the diaphragm at of the octagon reduced thinness portion being planar and covering the circular recess, the major surface acting as valve face for the valve seat in a closed position to stop the flow of fluid in the flow channel and in an open position to allow flow of fluid in the flow channel.

* * * * *